United States Patent

[11] 3,634,781

[72] Inventor Wilfried Hammelehle
 Munich, Germany
[21] Appl. No. 810,158
[22] Filed Mar. 25, 1969
[45] Patented Jan. 11, 1972
[73] Assignee Telefunken Patentverwertungsgesellschaft m.b.H.
 Ulm On Danube, Germany
[32] Priority Mar. 30, 1968
[33] Germany
[31] P 17 62 068.7

[54] PULSE GENERATOR
 3 Claims, 1 Drawing Fig.
[52] U.S. Cl. .................................. 331/108 D, 331/111
[51] Int. Cl. .................................. H03k 3/282
[50] Field of Search .................................. 307/293; 340/249; 331/111, 108; 315/100

[56] References Cited
UNITED STATES PATENTS

| | | | |
|---|---|---|---|
| 3,049,627 | 8/1962 | Higginbotham | 307/293 |
| 3,082,329 | 3/1963 | Meyer et al. | 331/111 |
| 3,109,941 | 11/1963 | Winchel | 307/293 |
| 3,165,648 | 1/1965 | Sainsbury | 307/293 |
| 2,901,669 | 8/1959 | Coleman | 331/108 |
| 3,289,103 | 11/1966 | Campman | 331/111 |
| 3,364,365 | 1/1968 | Eisenhauer | 307/288 |

Primary Examiner—John Kominski
Attorney—Spencer & Kaye

ABSTRACT: A pulse generator which is particularly suitable for use in electrical blinker systems has at least one transistor for producing the pulses with an emitter resistor which is at the same time a component of a voltage divider determining the base potential of the transistor. A number of transistors may be used in parallel, said one transistor being that which when cutoff reduces the flow in the generator load circuit or whose base emitter path lies in the discharging path of a time-determining element.

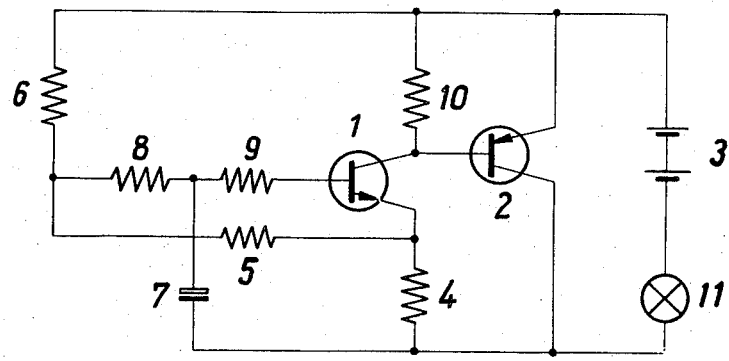

PULSE GENERATOR

BACKGROUND OF THE INVENTION

The invention relates to a pulse generator which has at least one transistor for producing the signal and is particularly suitable for use in electrical blinker systems, particularly those systems such as are used today, to indicate possible sources of danger for example for road traffic.

SUMMARY OF THE INVENTION

The invention consists in that this transistor for producing the signal has an emitter resistor which, at the same time, is a component of a voltage divider determining the base potential of this transistor.

In a generator having a plurality of transistors for producing the signal, according to the invention the transistor which, in the cutoff state, also reduces the flow of current through the load connected up to the generator, preferably comprises the emitter resistor included in the voltage divider.

The pulse generator according to the invention has the characteristic that its output signal becomes zero as soon as the battery voltage had dropped below a predetermined minimum value which is determined essentially by the values chosen for the voltage divider containing the emitter resistor. If the generator according to the invention is used for the control of a battery-operated blinker system for example, then this characteristic permits a test which, in an astonishingly simple manner, provides information regarding the state of charge of the battery in such a system. For this test, an additional load is applied to the battery for example by pressing a test button, with the device switched on. If the battery is already discharged beyond a maximum permissible value, then as a result of the additional load, its voltage drops below a specific value and the output signal of the generator according to the invention becomes zero. Thus as a result of the absence of the blinker signal when the test button is pressed, an indication is given to the user of the system that the battery of his device is nearly run down and must be exchanged for a new one.

Particularly in view of this use of the invention in battery-operated equipment, it is advisable to construct the pulse generator according to the invention in accordance with a circuit the basic principle of which is known and in which at least two transistors of different polarity are interconnected to form a trigger stage in such a manner that, during operation, they are either cut off or conducting simultaneously. In a pulse generating stage built up on this basic principle, according to the invention the transistor of which the base-to-emitter path is a component of the charge or discharge path of the time-determining element, comprises the emitter resistor which, at the same time, is a component of a voltage divider determining the base potential of this transistor.

BRIEF DESCRIPTION OF THE DRAWING

The invention will now be described in greater detail by way of example with reference to the accompanying drawings, the single FIGURE of which is a circuit diagram of one embodiment of the invention.

DESCRIPTION OF THE PREFERRED EMBODIMENT

The generator shown in this figure comprises two transistors 1 and 2 which have a different polarity. With the polarity of the supply voltage 3 given in this circuit diagram, the transistor 1 is of the NPN-type, while the PNP-type is used for the transistor 2. Connected into the emitter circuit of the transistor 1 is the resistor 4 which is a component of a voltage divider composed of the three resistors 4, 5 and 6. The point between the resistors 5 and 6 is coupled to the base of the transistor 1 as regards direct current. The capacitor 7 is provided as a time-determining element and the base-to-emitter path of the transistor 1 lies in its discharge path.

A particularly satisfactory solution for the pulse generator is obtained if, as shown in FIG. 1, the base of the transistor 1 is connected, through two resistors 8 and 9, to the base voltage divider, and the time-determining element, for example the capacitor 7 shown in the figure, is connected by one terminal to the point between the two resistors 8 and 9. As a result of this particular circuitry, the pulse repetition frequency and the pulse duration can be adjusted to the required values in a simple manner substantially independently of the value chosen for the rest of the circuit.

The current path which runs through the transistor 1, as well as its collector resistor 10 and emitter resistor 4, has the emitter-to-collector path of the transistor 2 connected in parallel with it, the base of the transistor 2 being connected directly to the collector of the transistor 1. In this specific embodiment of the invention, the load, for example the lamp 11, is connected in known manner into one of the two current supply leads which connects the stage composed of the two transistors 1 and 2 to the supply voltage 3.

In operation, when the voltage from the source 3 is initially applied, no voltage will be present across the capacitor 7, i.e., the capacitor 7 is completely discharged. The application of the operating voltage, however, produces an emitter potential at transistor 1 via the voltage divider consisting of resistors 4, 5 and 6 and both of the transistors 1 and 2 are biased to their nonconducting states. Since the capacitor 7 has one of its terminals connected to the voltage divider 4,5,6 via the resistor 8, capacitor 7 will charge through resistor 8 until the voltage at the base of the transistor 1 is sufficient to cause transistor 1 and consequently transistor 2, to switch to their conductive states. Switching of the transistor to its conductive state, however, obviously causes the pulse generator circuit to be short circuited and consequently the operating potential drops across the load resistance represented by the lamp 11.

The short circuiting of the pulse generator permits capacitor 7 to discharge over various paths, and in particular through the base-emitter path of transistor 1. As soon as the capacitor 7 has discharged sufficiently, transistors 1 and 2 will automatically switch from their conductive state to their cutoff or nonconductive state, thus causing the entire circuit to be returned to its original state and the charging of the capacitor 7, via the resistor 8, to be again initiated. This repeated charging and discharging action of the capacitor 7 will continue so long as the operating potential is sufficiently great to be able to cause the switching of the transistor 1.

With a sufficiently high battery voltage, the circuit according to the invention scarcely differs, in its mode of operation, from known arrangements which do not have the emitter resistor included in a voltage divider determining the base bias of a transistor. If, for any reason, the battery voltage drops to such an extent that the voltage at the resistor 5 can no longer exceed the base-to-emitter forward voltage which makes the barrier resistance zero, that is to say that voltage at which the transistor begins to conduct, then both transistors remain cut off; the output signal of the pulse generator according to the invention becomes zero.

It will of course be appreciated that with a suitable high-voltage battery, the transistor 2 could be dispensed with. If a larger current capacity is required, one or more additional transistors could be used connected in parallel with the transistor to and controlled either by the transistor 1 or by immediately preceding transistors.

What I claim as new and desire to secure by Letters Patent of the United States is:

1. In a pulse generator for continuously providing pulses to a load, said pulse generator having at least first and second transistors with the emitter-collector path of each of said transistors being connected in parallel with a source of operating voltage and with the base of said first transistor being connected to the collector of said second transistor, an emitter resistor for said second transistor, and means for causing said transistors to simultaneously alternately switch between a cutoff and a conducting state, the improvement comprising: a voltage divider including said emitter resistor and first and second further resistors and connected in parallel with said source of operating voltage, the base of said second transistor being connected to a point on said voltage divider between said first and second further resistors to determine the base potential thereof, said base of said second transistor being connected to said point on said voltage divider between said first and second further resistors via third and fourth further resistors connected in series; and said means for causing said transistors to switch between a cutoff and a conducting state including a capacitor for determining the pulse frequency and the pulse duration of said pulse generator, said capacitor having one terminal connected to a point between said third and fourth further resistors and its other terminal connected to said source of operating voltage.

2. A pulse generator as defined in claim 1, wherein said load is in series with said source of operating voltage and wherein said transistors in the cutoff state reduce the flow of current in the generator load circuit.

3. A pulse generator as defined in claim 1, wherein said transistors are of different polarity and form a trigger stage wherein said means for causing said transistor to switch between a cutoff and a conducting state includes a time-determining element in whose discharging path the base-to-emitter path of said second transistor lies.

* * * * *